(12) United States Patent
Menendez

(10) Patent No.: US 11,297,388 B2
(45) Date of Patent: Apr. 5, 2022

(54) SYSTEMS AND METHODS FOR DEEP RECOMMENDATIONS USING SIGNATURE ANALYSIS

(71) Applicant: Rovi Guides, Inc., San Jose, CA (US)

(72) Inventor: Juan Gerardo Menendez, Sunnyvale, CA (US)

(73) Assignee: Rovi Guides, Inc., San Jose, CA (US)

(*) Notice: Subject to any disclaimer, the term of this patent is extended or adjusted under 35 U.S.C. 154(b) by 23 days.

(21) Appl. No.: 16/698,625

(22) Filed: Nov. 27, 2019

(65) Prior Publication Data

US 2021/0160572 A1    May 27, 2021

(51) Int. Cl.
*H04N 21/466* (2011.01)
*G06K 9/62* (2022.01)
*G06K 9/00* (2022.01)
*G06N 20/00* (2019.01)

(52) U.S. Cl.
CPC ..... *H04N 21/4666* (2013.01); *G06K 9/00744* (2013.01); *G06K 9/00765* (2013.01); *G06K 9/6256* (2013.01); *G06N 20/00* (2019.01); *H04N 21/4668* (2013.01)

(58) Field of Classification Search
CPC .. H04N 21/466; H04N 21/4668; G06N 20/00; G06K 9/00744; G06K 9/00765; G06K 9/6256
See application file for complete search history.

(56) References Cited

U.S. PATENT DOCUMENTS

| | | | |
|---|---|---|---|
| 9,280,742 B1 | 3/2016 | Sargin et al. | |
| 2007/0101147 A1* | 5/2007 | Brunk | G06K 9/00744 713/176 |
| 2013/0259399 A1 | 10/2013 | Ho et al. | |
| 2014/0033239 A1 | 1/2014 | Wang et al. | |
| 2015/0310307 A1 | 10/2015 | Gopalan | |
| 2016/0292510 A1* | 10/2016 | Han | G11B 27/06 |
| 2019/0035431 A1* | 1/2019 | Attorre | G10L 17/00 |
| 2019/0110103 A1 | 4/2019 | El Kaliouby et al. | |
| 2019/0205962 A1 | 7/2019 | Piramuthu et al. | |

OTHER PUBLICATIONS

U.S. Appl. No. 16/698,618, filed Nov. 27, 2019, Juan Gerardo Menendez.

\* cited by examiner

*Primary Examiner* — Chenea Davis
(74) *Attorney, Agent, or Firm* — Haley Guiliano LLP

(57) ABSTRACT

Systems and methods are described herein for providing content item recommendations based on a video. Specifically, content item recommendations are provided using a machine learning model. The machine learning model is trained using feature vectors that are correlated to one another. The correlated feature vectors include information indicative of a texture and shape intensity of an image. Using the feature vectors (e.g., image or video signatures), a recommendation system improves content recommendation using analytic and quantitative characteristics derived from a frame of a content item rather than merely manually labeled bibliographic data (e.g., a genre or producer).

20 Claims, 8 Drawing Sheets

900

902
Receive a user selection of at least one frame of a content item

904
Determine, based on user profile, a likelihood of interest in the recommended content item

906
Likelihood of interest in recommended content item exceeds a threshold?

No → 910 Update the recommendation based on user profile → 912 Cause to be provided the updated recommendation Yes → 914 Cause to be provided the recommendation

FIG. 9

SYSTEMS AND METHODS FOR DEEP RECOMMENDATIONS USING SIGNATURE ANALYSIS

BACKGROUND OF THE INVENTION

The present disclosure is directed to recommending content, and more particularly, to recommending of content based on image or video analysis using a machine learning model.

SUMMARY

A content item can be produced with variations in cinematography, lighting, camerawork, theme, or any suitable visual characteristic (e.g., defined by artistic choices). A single film may have scenes shot in bright colors for a romantic and upbeat scene and scenes shot in hues of dark colors for a scene depicting mystery and danger. Content recommendations more accurately reflect the various segments in a content item when the recommendations are based upon a feature vector generated corresponding to at least one frame of a video (e.g., video signatures of content item segments). Using video signatures (e.g., generated based on texture and shape intensity of an image), a recommendation system causes content recommendations to be provided based on analysis of the video signatures using a machine learning model. Such a recommendation system is referred to herein as a "deep recommendation system." A deep recommendation system improves content recommendation using analytic and quantitative characteristics derived from a frame of a content item rather than merely manually labeled bibliographic data (e.g., a genre or producer). For example, a system recommends content to a user watching a dramatic film set on an island. Bibliography-based recommendations may be limited to other dramatic films. Recommendations made based on manually labeled metadata may include films with the same actor or produced during the same time period. However, improved recommendations may be made using signature analysis of at least one frame of a video (e.g., deep recommendations). In some embodiments, deep recommendations are made using a video signature such that videos with similar signatures are recommended. For example, a video signature for the film "Cast Away" is used to cause a recommendation for "Kong: Skull Island" or "Blue Lagoon" because of similar quantitative characteristics of images (e.g., texture analysis and shape intensities of images of an ocean, islands, or sand). In this way, users may receive recommendations that capture quantitative characteristics of content items they are interested in that cannot be determined by manual labeling of bibliographic data.

Systems and methods are described herein for providing content item recommendations based on a video. In some embodiments, a deep recommendation system determines a texture associated with at least one frame of the video. The at least one frame of the video is transformed to generate a shape intensity. The deep recommendation system generates a feature vector based on the texture, the shape intensity, and temporal data corresponding to the at least one frame of the video. The feature vector is analyzed using a machine learning model to produce a machine learning model output. The deep recommendation system causes a content item recommendation to be provided based on the machine learning model output.

In some embodiments, the deep recommendation system analyzes the feature vector using a machine learning model comprising at least one of a neural network or a Bayesian network. Transforming the at least one frame of the video may include transforming the at least one frame of the video using a Generalized Hough Transform (GHT). The temporal data may be determined using changes between respective frames of the at least one frame (i.e., where the at least one frame includes two or more frames). In some embodiments, the feature vector is generated based on a mathematical operation of feature vectors of respective frames of the at least one frame of the video. For example, the generated feature vector is a weighted average of feature vectors of respective frames of a scene in a film. In some embodiments, the deep recommendation system receives a user input indicative of the at least one frame of the video for which the recommended content item is to be provided. In such embodiments, a deep recommendation system causes a subset of frames of the recommended content item to be recommended. The subset of frames may be correlated to the at least one frame of the video. For example, a user input indicates a scene of a film for which he or she is requesting a content item recommendation to be provided and the deep recommendation system provides a recommended scene of a film that is correlated to the indicated scene.

In some embodiments, the deep recommendation system trains a machine learning model. Feature vectors correlated to one another are received. The feature vectors include information indicative of texture and shape intensity. The deep recommendation system uses the feature vectors to train the machine learning model to produce a machine learning model output for providing a content item recommendation. In some embodiments, the feature vectors that are correlated to one another are from at least one video (e.g., feature vectors generated from frames from two videos). The feature vectors may include information indicative of a texture associated with at least one frame of a video, a shape intensity based on a transform of the at least one frame of the video, and temporal data corresponding to the at least one frame of the video. In some embodiments, the transform of the at least one frame of the video is based on a GHT. The machine learning model may include at least one neural network.

It should be noted that the systems, methods, apparatuses, and/or aspects described above may be applied to, or used in accordance with other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout and in which:

FIG. 9 depicts a flowchart of an illustrative process for causing a recommended content item to be provided based on a generated feature vector and a user profile, in accordance with some embodiments of the disclosure.

DETAILED DESCRIPTION OF THE DRAWINGS

Figure 1:
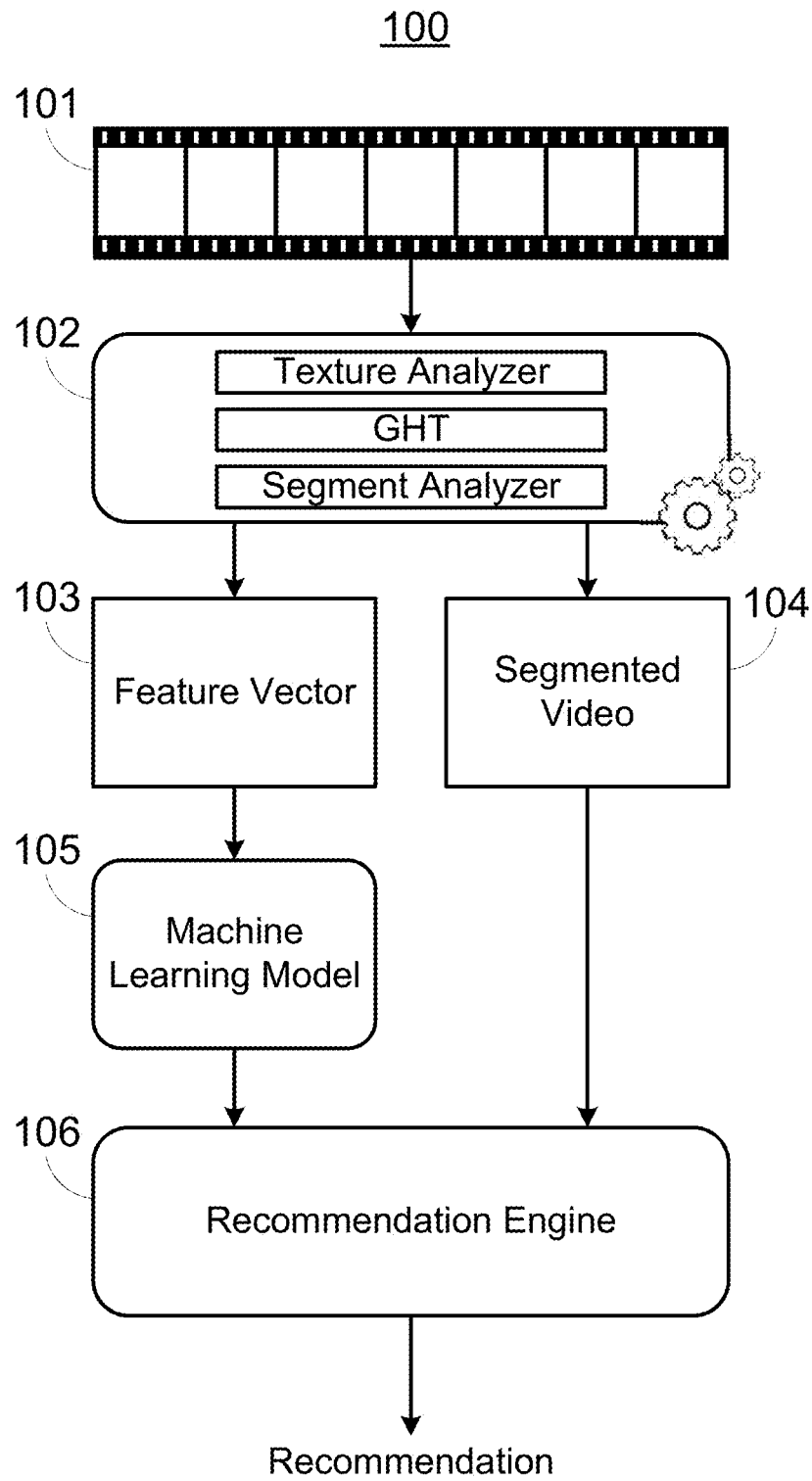
FIG. 1 shows a block diagram of an illustrative system for providing deep recommendations using signature analysis, in accordance with some embodiments of the disclosure.

FIG. 1 shows a block diagram of illustrative system 100 for providing deep recommendations using signature analysis. Video 101 is input to system 100. At least one video frame of video 101 is processed using signature analyzer 102. Signature analyzer 102 includes a texture analyzer, a GHT, and a segment analyzer. The output of signature analyzer 102 is feature vector 103 and segmented video 104. In some embodiments, feature vector 103 includes multiple feature vectors that are respectively mapped to video segments of segmented video 104. Feature vector 103 is analyzed using machine learning model 105 to produce a machine learning model output that is input to recommendation engine 106. Recommendation engine 106 causes a content item recommendation to be provided based on the machine learning model output. System 100 may include hardware, such as control circuitry and processing circuitry, as described in the descriptions of FIGS. 5-6, that is configured to perform any of the steps in the process for providing deep recommendations using signature analysis.

As referred to herein, the term "signature analysis" refers to the analysis of a generated feature vector corresponding to at least one frame of a video using a machine learning model. As referred to herein, a signature analysis for video includes signature analysis for a static image (e.g., at least one frame of a video). As referred to herein, a video signature includes a feature vector generated based on texture, shape intensity, and temporal data corresponding to at least one frame of a video. As referred to herein, the term "content item" should be understood to mean an electronically consumable user asset, such as television programming, as well as pay-per-view programs, on-demand programs, Internet content (e.g., streaming content, downloadable content, or Webcasts), video, audio, playlists, electronic books, social media, applications, games, any other media, or any combination thereof. Content items may be recorded, played, displayed or accessed by devices. As referred to herein, "content providers" are digital repositories, conduits, or both of content items. Content providers may include cable sources, over-the-top content providers, or other sources of content. As referred to herein, the term "deep recommendations" refers to content recommendations made using image or video signature analysis.

At least one frame of video 101 is used to generate feature vector 103. In some embodiments, the deep recommendation system determines a texture associated with the at least one frame of video 101 using the texture analyzer of signature analyzer 102. The texture analyzer may use a statistical texture measurement method such as edge density and direction, local binary partition, co-occurrences matrices, autocorrelation, Laws texture energy measures, any suitable approach to generating texture features, or any combination thereof. Texture determination is discussed in the description of FIG. 2. In some embodiments, the deep recommendation system transforms the at least one frame of video 101 to generate a shape intensity. A GHT is shown in signature analyzer 102 of FIG. 1 and is further described in FIG. 3, but any suitable method for determining a shape intensity may be used. For example, in some embodiments, a shape intensity determination technique that employs a shape-based snake model (e.g., in combination with a GHT or on its own) may be used. In some embodiments, the recommendation system selects a texture blob and identifies the texture boundary in an image yielding a closed form. Such a closed form may be mapped in an image by inferring the shape based on salient features in the image. For example, the texture analysis is extended to generate a map of the texture, a distance measure for the salient textures is determined (e.g. Mahalanobis distance), and the count of texture pixels at that map location is added. Signature analyzer 102 includes a segment analyzer that, in some embodiments, determines changes in texture and shape intensity across frames of the video (e.g., over time) in order to segment the at least one frame. For example, a sufficiently large change in texture, shape intensity, or a combination thereof between a first frame and a second frame segments them from one another. Changes between frames over time (e.g., changes in texture and shape intensity) may define temporal data used to generate a feature vector corresponding to at least one frame of a video. Segmented video 104 includes segmented frames according to the segment analyzer of signature analyzer 102. In some embodiments, segmented video 104 is mapped to feature vector 103 (e.g., the feature vector is generated using the segmented frames of segmented video 104).

Feature vector 103 is analyzed using machine learning model 105 to produce a machine learning model output. In some embodiments, a machine learning model includes a neural network, a Bayesian network, any suitable computational characterization model, or any combination thereof. In some embodiments, a machine learning model output includes a value, a vector, a range of values, any suitable numeric representation for determining a recommended content item, or any suitable combination thereof. For example, the machine learning model output is a range of texture values, shape intensity values, and changes over time to those values. The ranges may be used to determine a recommended content item having at least one video frame that generates a feature vector having values within the ranges.

In some embodiments, recommendation engine 106 causes a recommendation to be provided using the machine learning model output of machine learning model 105 and segmented video 104 mapped to feature vector 103. For example, the deep recommendation system provides a recommendation for segments of a video (e.g., a scene of a film) and provides the recommendation and an indication of the segments. This is depicted in embodiment 400 of FIG. 4

(e.g., similar scenes 406a corresponding to scene 402a). Although not depicted, recommendation engine 106 may cause a recommendation to be provided using only the machine learning model output of machine learning model 105. For example, the deep recommendation system provides a recommendation for an entire film without necessarily specifying a scene to which the recommendation corresponds.

Figure 2:
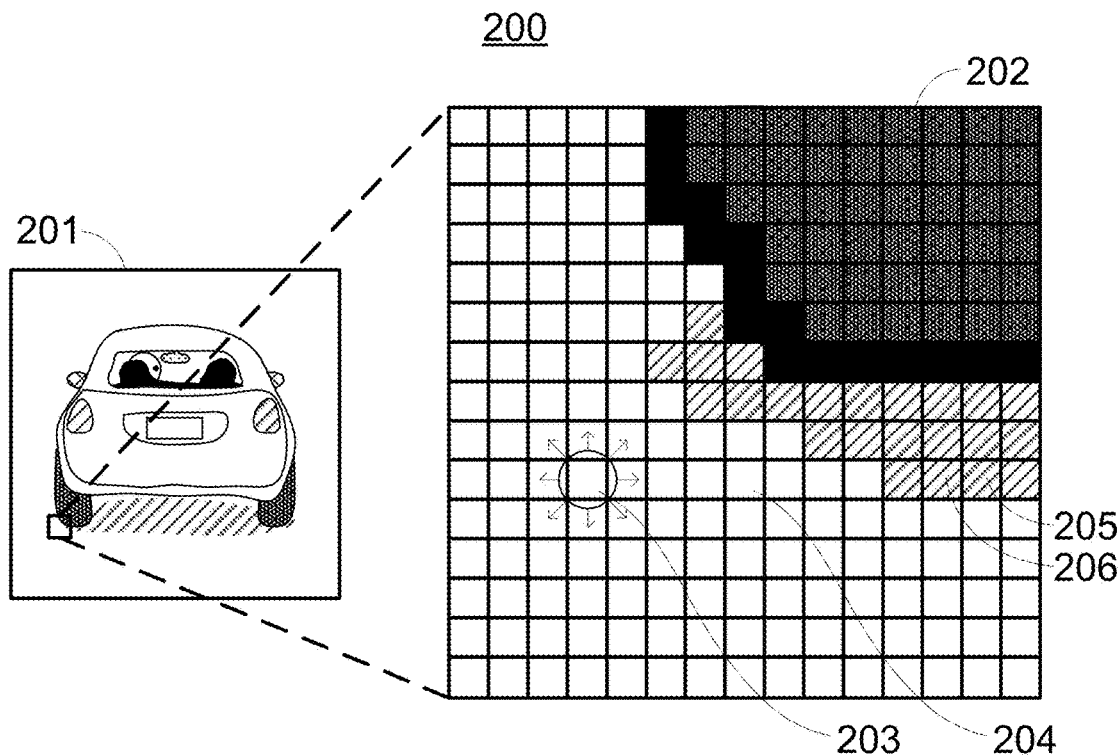
FIG. 2 shows an illustrative representation of texture analysis of an image, in accordance with some embodiments of the disclosure.
Figure 3:
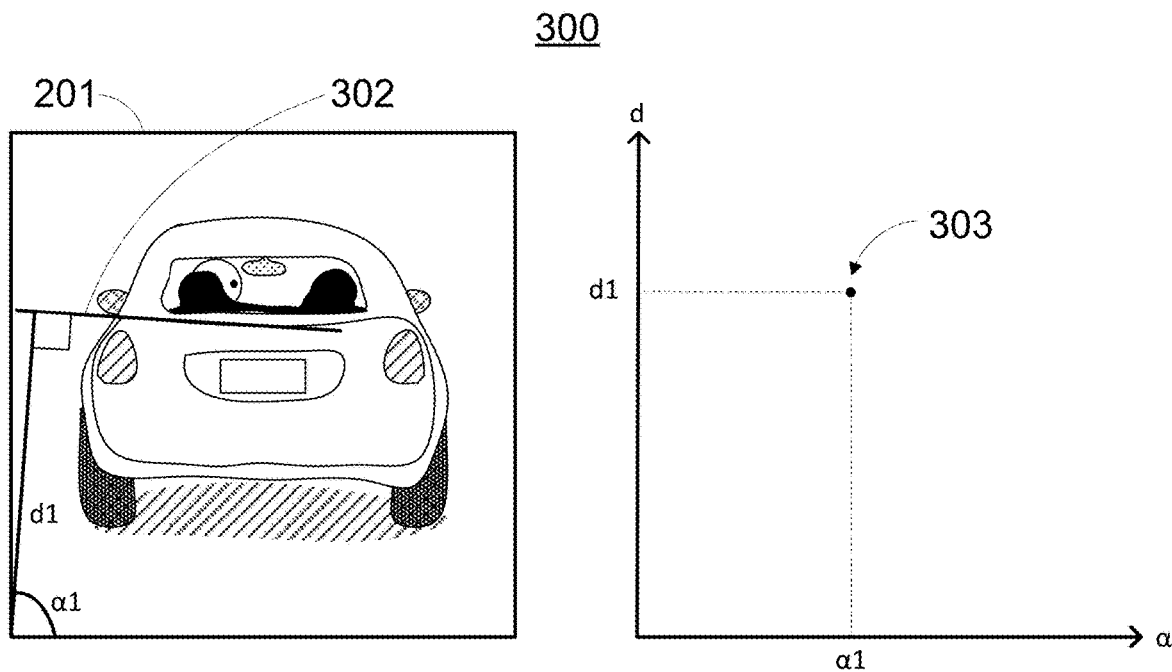
FIG. 3 shows an illustrative representation of shape intensity analysis of an image, in accordance with some embodiments of the disclosure.

FIGS. 2 and 3 show representations of mathematical operations performed on image 201. Although not depicted, the mathematical operations (e.g., texture analysis and Generalized Hough Transform) performed on image 201 may be applied to a series of images (i.e., frames of a video).

FIG. 2 shows illustrative representation 200 of texture analysis of image 201. An enlarged view of image 201 shows pixelwise representation of portion 202 of image 201. Pixel 203 is located in portion 202. The texture of image 201 may be determined by statistical texture measurement methods such as edge density and direction, local binary partition, co-occurrence matrices, autocorrelation, Laws texture energy measures, any suitable approach to generating texture features, or any combination thereof.

In some embodiments, the deep recommendation system uses local binary partition (LBP) to determine a texture associated with at least one frame of a video. For example, each center pixel in image 201 is examined to determine if the intensity of its eight nearest neighbors are each greater than the pixel's intensity. The eight nearest neighbors of pixel 203 have the same intensity. The LBP value of each pixel is an 8-bit array. A value of 1 in the array corresponds to a neighboring pixel with a greater intensity. A value of 0 in the array corresponds to a neighboring pixel with the same or lower intensity. For pixel 203 and pixel 204, the LBP value is an 8-bit array of zeros. For pixel 205 and 206, the LBP value is an 8-bit array of 3 zeroes and 5 ones (e.g., 11100011), corresponding to the 3 pixels of lower intensity and 5 pixels of higher intensity. A histogram of the LBP values for each pixel of the image may be used to determine the texture of the image.

Co-occurrence matrices may be used to determine a texture associated with at least one frame of a video. A histogram indicative of the number of times a first pixel value (e.g., a gray tone or color value) co-occurs with a second pixel value in a certain spatial relationship. For example, a co-occurrence matrix counts the number of times a color value of (0, 0, 0) appears to the left of a color value of (255, 255, 255). The histogram from a co-occurrence matrix may be used to determine the texture of the image.

FIG. 3 shows illustrative representation 300 of shape intensity analysis of image 201. In some embodiments, a GHT is used to generate a shape intensity of an image. Although the shape used in representation 300 is a line, any analytically defined shape (e.g., line, circle, or ellipse) or non-analytically defined shape (e.g., an amoeba-like shape) may be used in a GHT. In some embodiments, any suitable shape may be used in a GHT based on, for example, pre-defined shapes or shapes detected in a reference image. For example, silhouettes of objects (e.g., human bodies) or combinations of shapes (e.g., circles, lines, any other suitable shape, or any combination thereof), or any other form may be used as the basis for a GHT in accordance with the present disclosure.

Line 302, depicted as defining the trunk of a car, is extended over the lines of the car for clarity. A perpendicular line at an angle α1 and at distance d1 intersects line 302. A GHT space defined by perpendicular line angles, α, at distances, d, define the axes for the GHT space. The line defining the trunk of the car in image 201 is mapped to point 303 in the GHT space.

Figure 4:
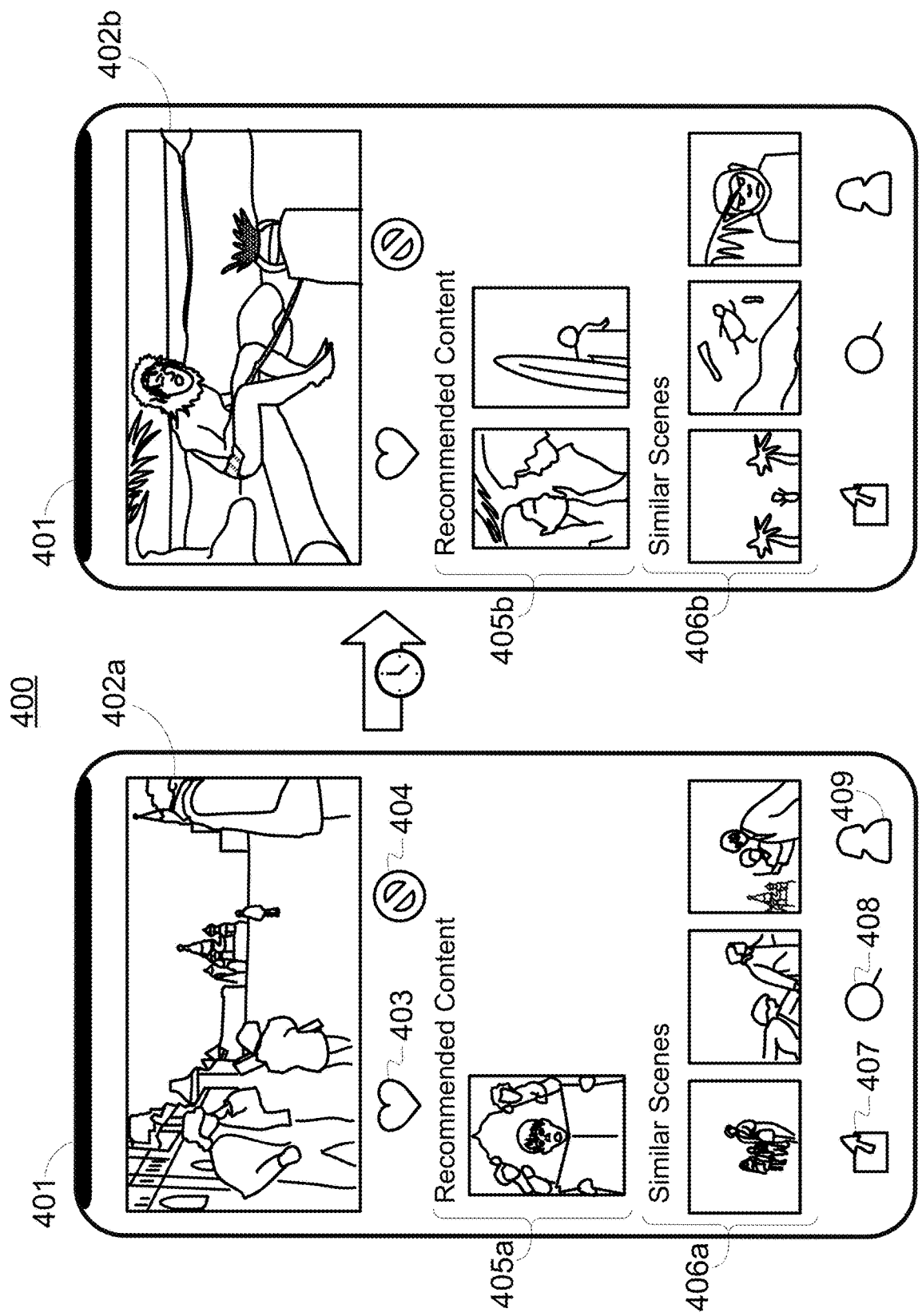
FIG. 4 depicts an illustrative embodiment of providing deep recommendations using signature analysis over time, in accordance with some embodiments of the disclosure.

FIG. 4 depicts illustrative embodiment 400 for providing deep recommendations using signature analysis over time. A graphical user interface (GUI) for providing deep recommendations is shown on device 401. A content item (e.g., the film "Cast Away") is provided for display in the GUI on device 401. At scene 402a of the film, the deep recommendation system recommends content 405a (e.g., the film "Home Alone 2: Lost in New York") and similar scenes 406b. As the film continues to be provided for display over time, the deep recommendation system determines different recommendations for scene 402b (e.g., recommended content 405b). As scenes of the film change over time, the deep recommendation system may determine that scenes 406b are similar to scene 402b. The deep recommendation system may receive user input of interest or disinterest in a content item (e.g., a film or scenes of the film) through interest icon 403 and disinterest icon 404, respectively. In some embodiments, the deep recommendation system receives a user request to share a content item through share icon 407, to search for new recommendations through search icon 408, and to access a user profile through user profile icon 409.

In some embodiments, the deep recommendation system determines, in real time, recommendations based on signature analysis of at least one video frame of a video. In embodiment 400, the deep recommendation system generates a feature vector based on frames of video from the film "Cast Away." Using any one of the methods described in the description of FIG. 2, the deep recommendation system may determine a texture associated with at least one frame of "Cast Away." Using the GHT described in the description of FIG. 3, the deep recommendation system may transform the frames of the video to generate a shape intensity. For example, the deep recommendation system uses frames presented through scene 402a during the initial minutes of the film (e.g., the first 5 minutes) to generate a feature vector.

In some embodiments, multiple feature vectors are generated for the respective frames of the film. For example, if the frame shown in scene 402a is the $7,000^{th}$ frame in the film having a frame rate of 24 frames per second, the deep recommendation system generates 7,000 feature vectors. In some embodiments, a feature vector is generated based on a mathematical operation of multiple feature vectors of the respective frames of the video. For example, a feature vector at scene 402a may be generated based on an average or weighted average of 7,000 feature vectors. Weights may be determined based on user selection of interest icon 403 or disinterest icon 404. For example, as a user selects icon 403, the deep recommendation system increases a weight associated with the feature vector generated for the scene that the user has indicated an interest in. Similarly, as a user selects icon 404, the deep recommendation system decreases a weight associated with the feature vector generated for the scene that the user has indicated a disinterest in. For example, a user may select icon 404 for a violent scene depicting blood and gore, and the deep recommendation system decreases a weight associated with a feature vector generated based on a frame depicting blood and gore.

In some embodiments, the deep recommendation system monitors how long the user has continuously consumed a content item and uses this time duration to adjust a weight for a feature vector. For example, the deep recommendation system determines that the user watched "Cast Away" for the first 5 minutes (e.g., including scene 402) and then stopped watching. The deep recommendation system decreases a weight associated with the feature vector generated based on the frames of scene 402. The deep recommendation system may determine that the user watched the entire film and increase weights associated with segments of the film (e.g., each scene), with the entire film, or a combination thereof.

As the deep recommendation system generates at least one feature vector for video frames through scene 402a, the deep recommendation system analyzes a feature vector generated based on video frames available through scene 402a (e.g., 300 frames of scene 402a of a boy running through St. Petersburg with a delivery package) using a machine learning model to produce a machine learning model output. For example, the deep recommendation system analyzes a feature vector generated based on frames of scene 402a using a neural network to produce a vector of three values corresponding to the range of texture, shape intensity, and temporal data. This machine learning model vector output may be used to compare the feature vector input to the machine learning model with feature vectors of a recommended content item. For example, a machine learning model vector output of variable values [A B C] and an input of values [1 2 3] are used by the deep recommendation system to provide a recommended content item associated with feature vectors having values within the range of $1\pm A$, $2\pm B$, and $3\pm C$ for the respective feature vector values. The machine learning model output is used by the deep recommendation system to cause a recommended content item to be provided. In embodiment 400, recommended content 405a and similar scenes 406a are provided in the GUI. Based on the video signature generated from frames of a city with buildings in the winter and a child running through a crowd, the deep recommendation system may recommend "Home Alone 2: Lost in New York" as recommended content 405a and scenes from films such as "Home Alone," "Willy Wonka & the Chocolate Factory," and "Harry Potter and the Sorcerer's Stone." In this way, the system recommends content with texture and shape intensity correlated with those of a feature vector generated from video frames having buildings in winter and children running through crowds.

The deep recommendation system, in some embodiments, receives requests for content item recommendations. In embodiment 400, requests are made using search icon 408. The system may provide on-demand recommendations, scheduled recommendations, reactive recommendations (e.g., providing a recommendation in response to a user's selection of interest icon 403), or any suitable combination thereof. For example, the deep recommendation system receives a user input (e.g., a user selection of an icon in the GUI) indicating at least one frame of "Cast Away" for which a recommended content item is to be provided. A user selects a frame from scene 406b of a man stranded on an island to provide instructions to the deep recommendation system to provide recommendations for content items having a correlated video signature. In some embodiments, the recommendations provided include a recommendation of a subset of frames of a recommended content item (e.g., a scene of a recommended film). For example, a subset of video frames from an episode of the television show "Lost" directed to a plane crash that causes the passengers to be stranded on an island is provided as a recommendation in response to the user selecting a scene from "Cast Away" of a plane crash that causes the protagonist to be marooned on an island. The deep recommendation system may determine a correlation between the feature vectors of "Cast Away" and "Lost" (e.g., the deep recommendation system considers image texture of islands in both content items).

In some embodiments, the recommendations are provided in response to an indication that a user is interested or disinterested in a content item. For example, the deep recommendation system receives a user selection of icon 404 at scene 402a. In response, the deep recommendation system may recommend content and not recommend similar scenes. For example, the deep recommendation system determines, based on the feature vector associated with scene 402a, a feature vector that is indicative of a different video signature. For example, the deep recommendation system may consider feature vectors outside of the range $1\pm A$, $2\pm B$, and $3\pm C$ to be indicative of a different video signature (e.g., a content item depicting a colorful and bright spring day instead of the winter day in scene 402a). In some embodiments, the deep recommendation system considers orthogonal feature vectors to be indicative of a different video signature. In some embodiments, the deep recommendation system receives a user selection of icon 403 at scene 402a. In response, the deep recommendation system causes recommended content 405a and similar scenes 406a to be provided.

Figure 5:
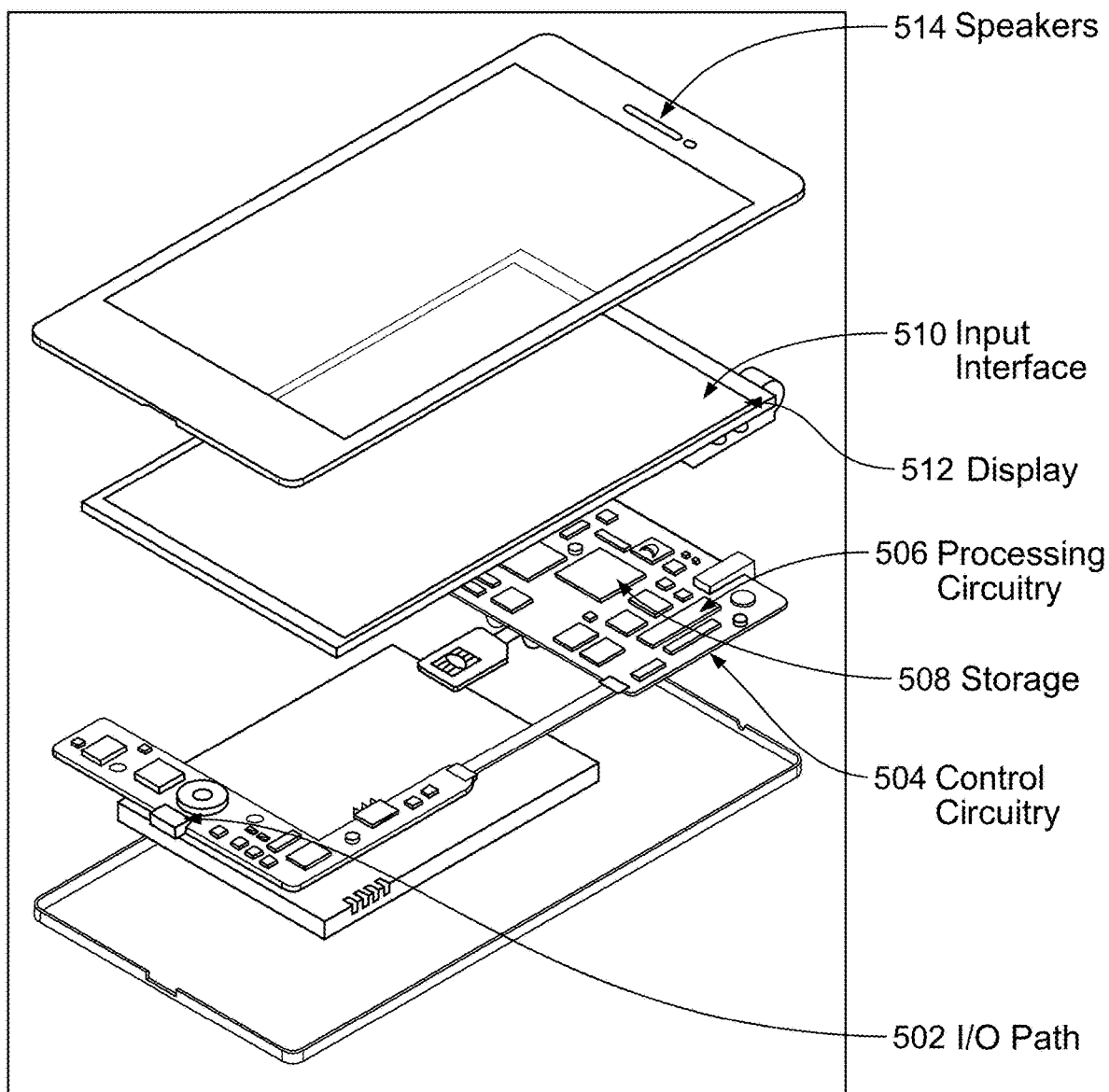
FIG. 5 is a block diagram of an illustrative device for providing content recommendations using a deep recommendation system, in accordance with some embodiments of the disclosure.

In some embodiments, the methods and systems described in connection with FIGS. 1-4 utilize a device on which to provide deep recommendations. FIG. 5 is a block diagram of an illustrative device 500, in accordance with some embodiments of the present disclosure. As referred to herein, device 500 should be understood to mean any device that can provide deep recommendations. As depicted, device 500 may be a smartphone or tablet, or may additionally be a personal computer or television equipment. In some embodiments, device 500 may be an augmented reality (AR) or virtual reality (VR) headset, smart speakers, or any other device capable of outputting deep recommendations.

Device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for causing to be provided deep recommendations based on image or signature analysis.

An application on a device may be a stand-alone application implemented on a device or a server. The application may be implemented as software or a set of executable instructions. The instructions for performing any of the embodiments discussed herein of the application may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 5 the instructions may be stored in storage 508, and executed by control circuitry 504 of device 500.

In some embodiments, an application may be a client-server application where only the client application resides on device 500 (e.g., device 602), and a server application resides on an external server (e.g., server 606). For example, an application may be implemented partially as a client application on control circuitry 504 of device 500 and partially on server 606 as a server application running on control circuitry. Server 606 may be a part of a local area network with device 602, or may be part of a cloud computing environment accessed via the Internet. In a cloud computing environment, various types of computing services for performing searches on the Internet or informational databases, gathering information for a display (e.g., information for providing deep recommendations for display), or parsing data are provided by a collection of network-accessible computing and storage resources (e.g., server 606), referred to as "the cloud." Device 500 may be cloud clients that rely on the cloud computing capabilities from server 606 to gather data to populate an application. When executed by control circuitry of server 606, the system may instruct the control circuitry to provide deep recommendations on device 602. The client application may instruct control circuitry of the receiving device 602 to provide deep recommendations for output. Alternatively, device 602 may perform all computations locally via control circuitry 504 without relying on server 606.

Control circuitry 504 may include communications circuitry suitable for communicating with a content server or other networks or servers. The instructions for carrying out the above-mentioned functionality may be stored and executed on server 606. Communications circuitry may include a cable modem, a wireless modem for communications with other equipment, or any other suitable communications circuitry. Such communications may involve the Internet or any other suitable communication network or paths. In addition, communications circuitry may include circuitry that enables peer-to-peer communication of devices, or communication of devices in locations remote from each other.

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, or any other suitable fixed or removable storage devices, and/or any combination of the same. Non-volatile memory may also be used (e.g., to launch a boot-up routine and other instructions). Cloud-based storage (e.g., on server 606) may be used to supplement storage 508 or instead of storage 508.

Control circuitry 504 may include display generating circuitry and tuning circuitry, such as one or more analog tuners, one or more MP3 decoders or other digital decoding circuitry, or any other suitable tuning or audio circuits or combinations of such circuits. Encoding circuitry (e.g., for converting over-the-air, analog, or digital signals to audio signals for storage) may also be provided. Control circuitry 504 may also include scaler circuitry for upconverting and downconverting content into the preferred output format of the device 500. Circuitry 504 may also include digital-to-analog converter circuitry and analog-to-digital converter circuitry for converting between digital and analog signals. The tuning and encoding circuitry may be used by the device to receive and to display, to play, or to record content. The tuning and encoding circuitry may also be used to receive guidance data. The circuitry described herein, including for example, the tuning, audio generating, encoding, decoding, encrypting, decrypting, scaler, and analog/digital circuitry, may be implemented using software running on one or more general purpose or specialized processors. Multiple tuners may be provided to handle simultaneous tuning functions. If storage 508 is provided as a separate device from device 500, the tuning and encoding circuitry (including multiple tuners) may be associated with storage 508.

A user may send instructions to control circuitry 504 using user input interface 510 of device 500. User input interface 510 may be any suitable user interface touch-screen, touchpad, stylus and may be responsive to external device add-ons such as a remote control, mouse, trackball, keypad, keyboard, joystick, voice recognition interface, or other user input interfaces. User input interface 510 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Speakers 514 may be provided as integrated with other elements of device 500 or may be stand-alone units. Display 512 may be used to display visual content while audio content may be played through speakers 514. In some embodiments, the audio may be distributed to a receiver (not shown), which processes and outputs the audio via speakers 514.

Control circuitry 504 may allow a user to provide user profile information or may automatically compile user profile information. For example, control circuitry 504 may track user preferences for different video signatures and deep recommendations. In some embodiments, control circuitry 504 monitors user inputs, such as queries, texts, calls, conversation audio, social media posts, etc., to detect user preferences. Control circuitry 504 may store the user preferences in the user profile. Additionally, control circuitry 504 may obtain all or part of other user profiles that are related to a particular user (e.g., via social media networks), and/or obtain information about the user from other sources that control circuitry 504 may access. As a result, a user can be provided with personalized deep recommendations.

Figure 6:
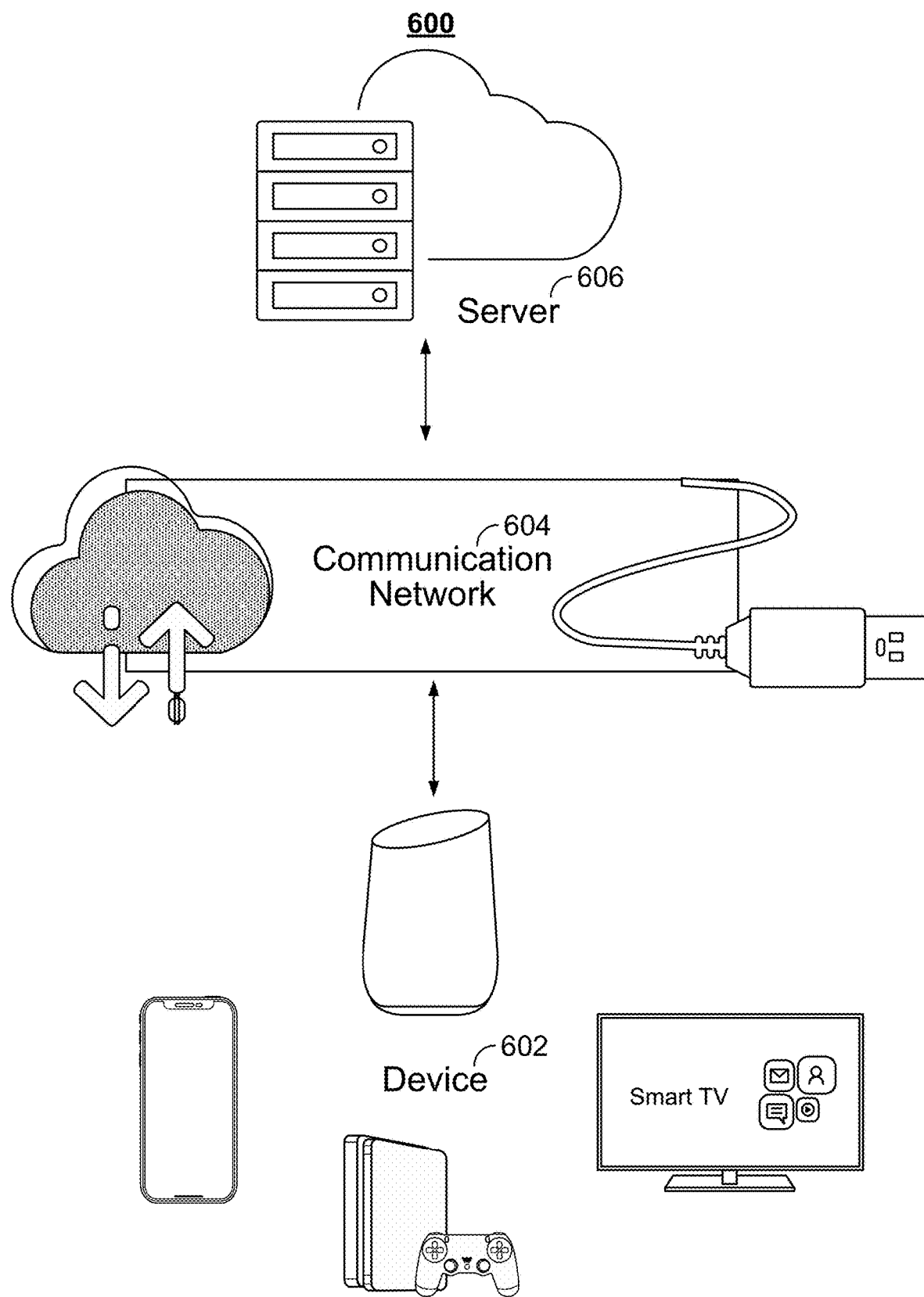
FIG. 6 is a block diagram of an illustrative system for providing deep recommendations using a deep recommendation system, in accordance with some embodiments of the disclosure.

Device 500 of FIG. 5 can be implemented in system 600 of FIG. 6 as device 602. Devices from which deep recommendations may be output may function as a standalone device or may be part of a network of devices. Various network configurations of devices may be a smartphone or tablet, or may additionally be a personal computer or television equipment. In some embodiments, device 602 may be an augmented reality (AR) or virtual reality (VR) headset, smart speakers, or any other device capable of outputting deep recommendations to a user.

In system 600, there may be multiple devices but only one of each type is shown in FIG. 6 to avoid overcomplicating the drawing. In addition, each user may utilize more than one type of device and also more than one of each type of device.

As depicted in FIG. 6, device 602 may be coupled to communication network 604. Communication network 604 may be one or more networks including the Internet, a mobile phone network, mobile voice or data network (e.g., a 4G or LTE network), cable network, public switched telephone network, Bluetooth, or other types of communications network or combinations of communication network. Thus, device 602 may communicate with server 606 over communication network 604 via communications circuitry described above. In should be noted that there may be more than one server 606, but only one is shown in FIG. 6 to avoid overcomplicating the drawing. The arrows connecting the respective device(s) and server(s) represent communication paths, which may include a satellite path, a fiber-optic path, a cable path, a path that supports Internet communications (e.g., IPTV), free-space connections (e.g., for broadcast or other wireless signals), or any other suitable wired or wireless communications path or combination of such paths. Further details of the present disclosure are discussed below in connection with the flowcharts of FIGS. 7-10. It should be noted that the steps of processes 700, 800, 900, and 1000 of FIGS. 7-10, respectively, may be performed by control circuitry 504 of FIG. 5.

Figure 7:
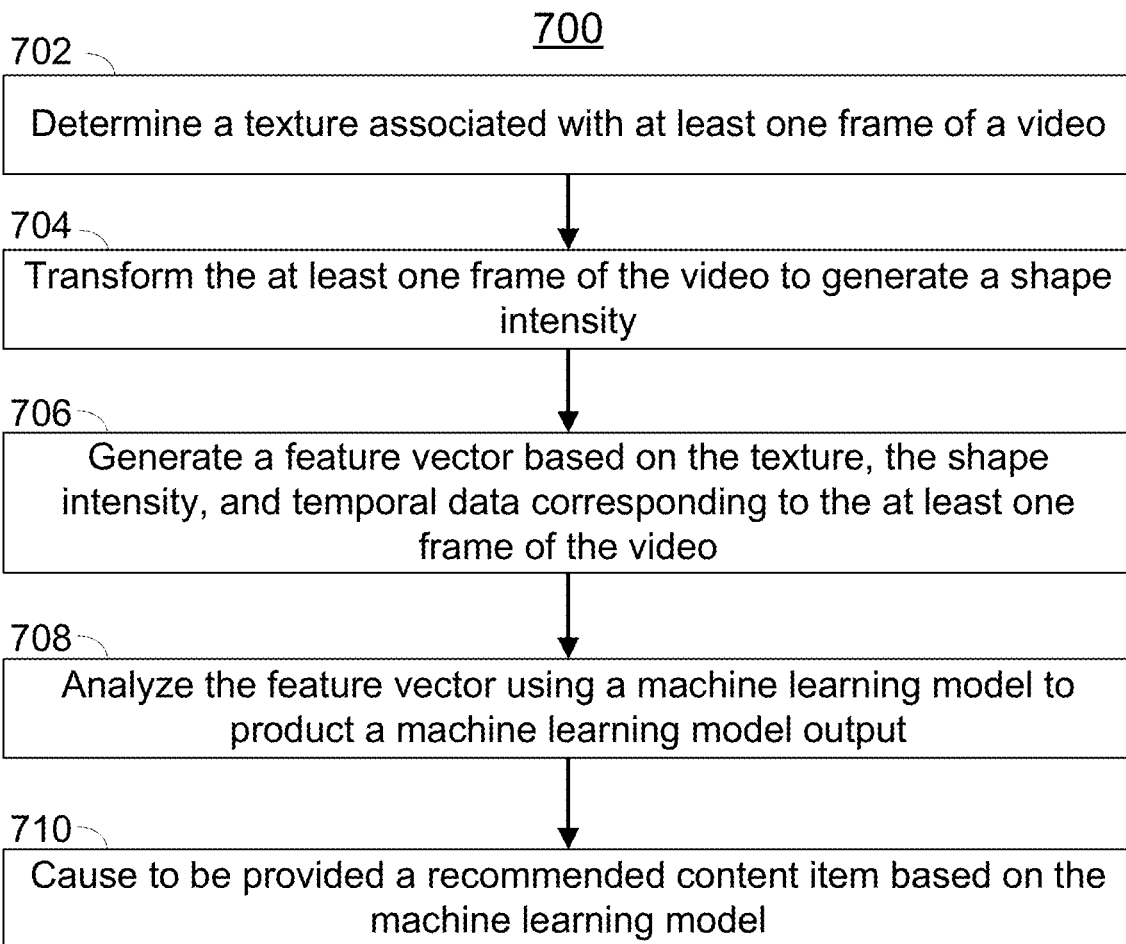
FIG. 7 depicts a flowchart of an illustrative process for causing a recommended content item to be provided based on a generated feature vector, in accordance with some embodiments of the disclosure.

FIG. 7 depicts a flowchart of illustrative process 700 for causing a recommended content item to be provided based on a generated feature vector.

At step 702, the deep recommendation system determines a texture associated with at least one frame of a video. A method as described in the description of FIG. 2 may be used to determine texture. For example, the deep recommendation system determines the texture of a video frame of scene 402a using co-occurrence matrices.

At step 704, the deep recommendation system transforms the at least one frame of the video to generate a shape intensity. A method as described in the description of FIG. 3 may be used to transform a frame of a video to generate a shape intensity. For example, the deep recommendation system determines the shape intensity of a video frame of scene 402a using a GHT to transform the video frame into a representation by angles and distances at which lines of the video frames are located.

At step 706, the deep recommendation system generates a feature vector based on the texture, the shape intensity, and temporal data corresponding to the at least one frame of the video. The texture determined in step 702 and shape intensity determined in step 704 may be structured in a feature vector with temporal data indicative of a change in texture and shape intensity over time. Temporal data corresponding to at least one frame of a video includes the time to display the at least one frame, the number of frames, a difference in texture and/or shape intensity over the time or number of frames, any suitable value of change over feature vector values for frames over time, or any combination thereof.

At step 708, the deep recommendation system analyzes the feature vector using a machine learning model to produce a machine learning model output. For example, the feature vector is analyzed using a neural network to produce a value indicative of a level of correlation between the frames of a video used to generate the feature vector in step 706 and the frames of a recommended video. In some embodiments, a machine learning model output includes a vector having values used to determine correlation between attributes of frames of a video (e.g., a vector having a value "1," indicating that a shape intensity that is within 1 of the input shape intensity value is correlated to the input shape intensity).

At step 710, the deep recommendation system causes a recommended content item to be provided based on the machine learning model output. As shown in embodiment 400 of FIG. 4, a deep recommendation system may provide recommendations of entire films or a particular scene from a film. A feature vector of scene 406b from "Cast Away" is used to cause recommendations of films such as "Kong: Skull Island" and "Blue Lagoon" to be provided.

Figure 8:
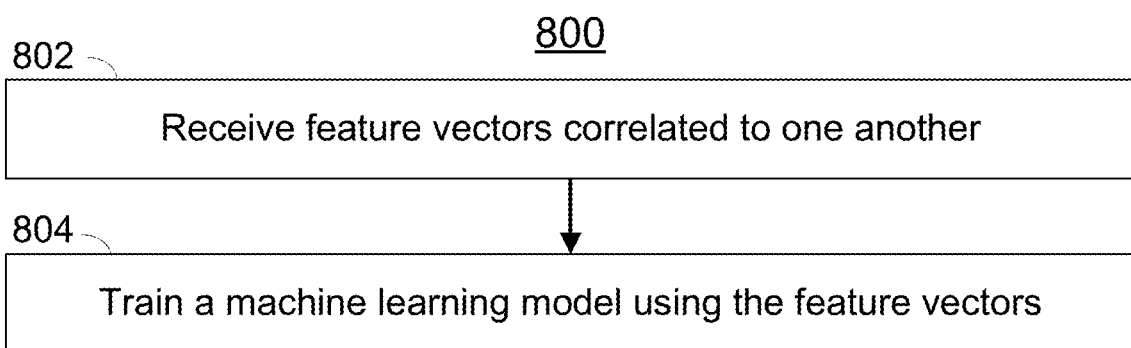
FIG. 8 depicts a flowchart of an illustrative process for training a machine learning model using feature vectors, in accordance with some embodiments of the disclosure.

FIG. 8 depicts a flowchart of illustrative process 800 for training a machine learning model using feature vectors.

At step 802, the deep recommendation system receives feature vectors correlated to one another. In some embodiments, the feature vectors include information indicative of texture and shape intensity. For example, a content provider that has generated feature vectors for its content items transmits the generated feature vectors to the deep recommendation system. The content provider may determine the texture of a video frame and transform the video frame to generate a shape intensity. The deep recommendation system, in turn, receives the textures and shape intensities in the feature vectors. The received feature vectors, in some embodiments, are from at least one video. For example, the machine learning model is trained using feature vectors that are correlated to one another and are from at least two videos (e.g., feature vectors generated from segments of "Cast Away" and "Home Alone" involving a boy running through crowds of people).

In some embodiments, the feature vectors received in step 802 include information indicative of a texture associated with at least one frame of a video, a shape intensity based on a transform of the at least one frame of the video, and temporal data corresponding to the at least one frame of the video. For example, the feature vectors include a value corresponding to the texture of at least one frame (e.g., as determined by methods described in the description of FIG. 2), the shape intensity of the at least one frame (e.g., as determined by methods described in the description of FIG. 3), and temporal data determined using changes between respective frames of the at least one frame (e.g., the difference in texture between two frames of the at least one frame).

At step 804, the deep recommendation system trains the machine learning model using the feature vectors to produce a machine learning model output for providing a content item recommendation. In some embodiments, training the machine learning model includes iteratively determining weights for a neural network while minimizing a loss function to optimize the weights.

FIG. 9 depicts a flowchart of illustrative process 900 for causing a recommended content item to be provided based on a generated feature vector and a user profile.

At step 902, the deep recommendation system receives a user selection of at least one frame of a content item. For example, a user selects the display of scene 402a in the GUI generated on device 401. In some embodiments, receiving a user selection of the at least one frame of the content item includes receiving a selection of interest icon 403 or disinterest icon 404. For example, a user selects interest icon 403 and the deep recommendation system determines that the user has selected at least one frame from the scene provided for display at the time (e.g., the user selects at least one frame from scene 402a by selecting interest icon 403).

At step 904, the deep recommendation system determines, based on a user profile, a likelihood of interest in the recommended content item. In some embodiments, a user profile (e.g., user profile accessible through user profile icon 409) maintains a record of which content items and/or video frames that the user has indicated an interest in. The deep recommendation system may supplement the recommendation made in process 700 using the user profile. For example, the user profile indicates that a user is interested in content items sharing a manually labeled qualitative or bibliographic characteristic such as a genre or an actor. The deep recommendation system may prioritize content recommendations determined from process 700 that are also characterized by interests as indicated in the user profile. For example, a user has an interest in or preference for, as indicated in the user profile, action films. In turn, the deep recommendation system determines a higher likelihood of interest in the action film "Kong: Skull Island" than the likelihood of interest in the romance film "Blue Lagoon."

In some embodiments, the deep recommendation system determines a likelihood that the user is interested in a recommended content item based on user selections of previously recommended content items. A user whose user profile indicates a preference for action films may have a higher rate of selecting a recommended content item from process 700 that is also characterized by the action genre. In some embodiments, the deep recommendation system determines the likelihood of an interest in a recommended content item based on the rate at which recommended content items are selected (e.g., a user has selected a recommended content item 1 time of 10 times that the deep recommendation system has caused the content item to be recommended).

At step 906, the deep recommendation system determines whether it is likely that an interest in a recommended content item exceeds a threshold. If the deep recommendation system determines that it is likely that the interest in the recommended content item does not exceed a threshold, process 900 proceeds to step 910. Otherwise, process 900 proceeds to step 914. For example, the deep recommendation system compares the likelihood of interest determined in step 904 to a threshold interest level of 60% (e.g., a threshold that the user is likely to select a content item at least 6 of 10 times).

At step 910, the deep recommendation system determines to update the recommendation (e.g., from process 700) based on the user profile. In some embodiments, the deep recommendation system removes a content item from a list of recommended content items generated through process 700 after determining that, based on the user profile, the likelihood of interest in the content item does not exceed a threshold.

At step 912, the deep recommendation system causes the updated recommendation to be provided. For example, when causing recommendations to be provided for scene 402b of "Castaway," the deep recommendation system causes the action film "Kong: Skull Island" to be displayed in a manner that visually distinguishes it from the romantic film "Blue Lagoon" (e.g., using a larger icon, using a different set of colors, ordering it first in a list).

Figure 10:
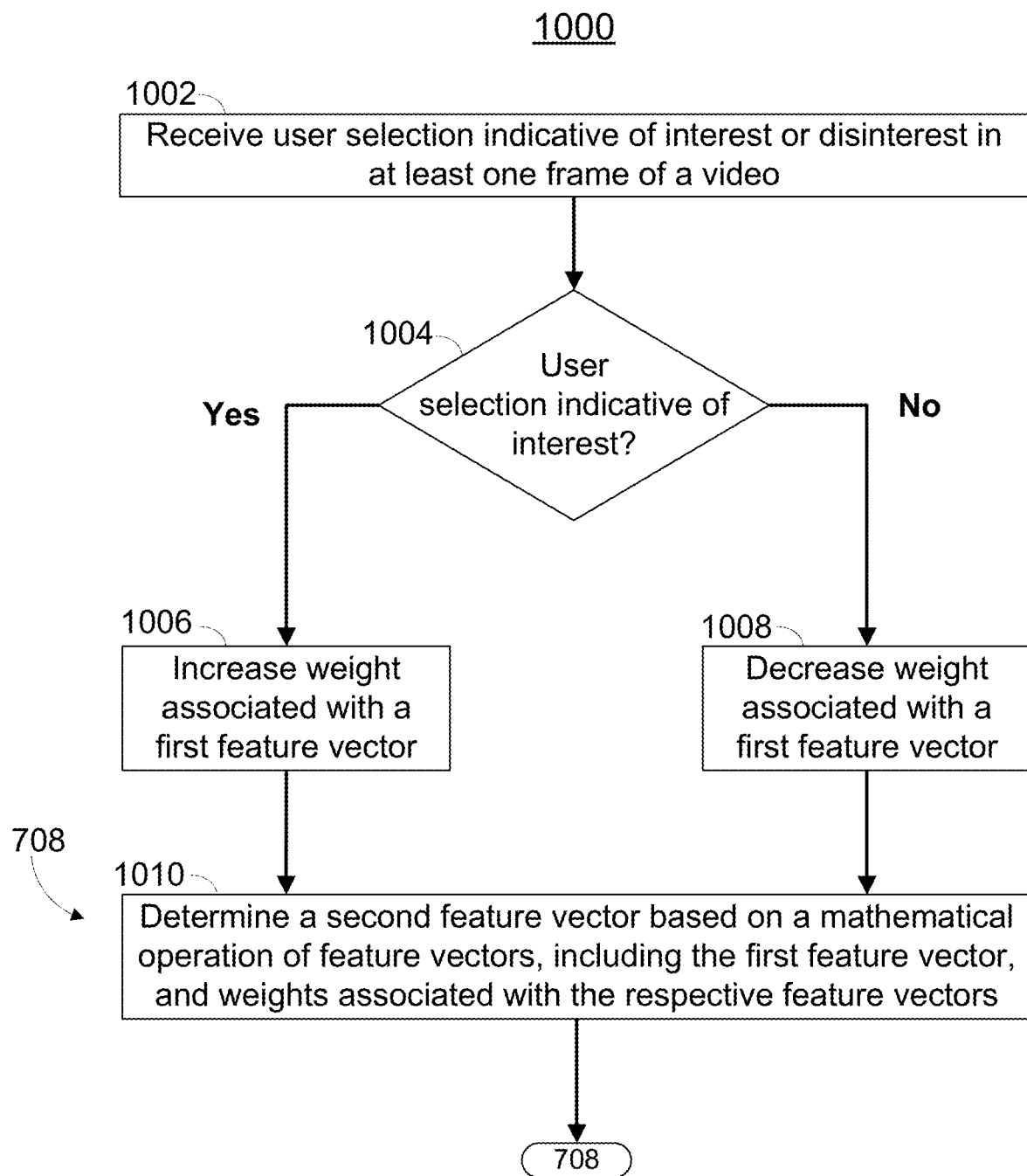
FIG. 10 depicts a flowchart of an illustrative process for determining a feature vector based on a mathematical operation of feature vectors and weights associated with the respective feature vectors, in accordance with some embodiments of the disclosure.

FIG. 10 depicts a flowchart of illustrative process 1000 for determining a feature vector based on a mathematical operation of feature vectors and weights associated with the respective feature vectors. Process 1000, although not depicted, may be incorporated with process 700 such that the first feature vector of process 1000 is the feature vector generated in process 700.

At step 1002, the deep recommendation system receives a user selection indicative of interest or disinterest in at least one frame of a video. For example, the deep recommendation system may receive user input through icon 403 or 404 of FIG. 4 indicative of an interest or disinterest, respectively, in a scene presented (e.g., scene 402a). In some embodiments, a user selection of a different content item is indicative of a disinterest in a currently presented content item. For example, a user selects a content item in a viewing history (e.g., accessible under user profile 409) that is associated with a feature vector indicative of dissimilarity (e.g., orthogonal feature vectors). The selection may be indicative that the user is not interested in scene 402a. In some embodiments, the deep recommendation system receives a user selection of recommended content 405a or 405b that is indicative of an interest in the content item. For example, the deep recommendation system receives a selection of "Blue Lagoon" in recommended content 405b indicative that the user is interested in films having texture and shape intensities correlated between films set on islands.

At step 1004, the deep recommendation system may determine whether the user selection is indicative of interest. If the user selection is indicative of interest, process 1000 proceeds to step 1006. Otherwise, if the user selection is not indicative of interest (e.g., indicative of disinterest), process 1000 proceeds to step 1008. As described in the description of step 1002, user selections such as a selection of interest icon 403 or a recommended content item are examples of selections indicative of interest. User selections such as a selection of disinterest icon 404 or a selection that is not the recommended content item or similar scenes (e.g., a selection of a content item that is associated with a feature vector indicative of dissimilarity or a selection to exit an application executing the deep recommendation system).

At step 1006, the deep recommendation system increases a weight associated with a first feature vector. The first feature vector may refer to the feature vector generated in step 700 based on a texture, shape intensity, and temporal data associated with frames of a video. For example, the deep recommendation system receives a selection of interest icon 403 during the presentation of scene 402a and increases a weight associated with the generated feature vector associated with scene 402a. In some embodiments, the deep recommendation system increases the weights associated with multiple feature vectors associated with respective video frames of scene 402a (e.g., 300 frames of scene 402a of a boy running through St. Petersburg with a delivery package).

At step 1008, the deep recommendation system decreases a weight associated with a first feature vector. For example, the deep recommendation system receives a selection of disinterest icon 404 during the presentation of scene 402a and decreases a weight associated with the generated feature vector associated with scene 402a. In some embodiments, the deep recommendation system decreases the weights associated with multiple feature vectors associated with respective video frames of scene 402a (e.g., 300 frames of scene 402a of a boy running through St. Petersburg with a delivery package).

At step 1010, the deep recommendation system determines a second feature vector based on a mathematical operation of feature vectors, including the first feature vector, and weights associated with the respective feature vectors. For example, the deep recommendation system calculates a weighted average of feature vectors of respective frames of the at least one frame of the video. In some embodiments, step 708 of process 700 includes step 1010. Steps 1002, 1004, 1006, and/or 1008 may be performed prior to step 708 in process 700 or in parallel with the steps of process 700.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for training a machine learning model, the method comprising:
   receiving a plurality of feature vectors from at least two different videos correlated to one another, wherein the plurality of feature vectors comprise information indicative of texture and shape intensity from respective segments of each different video that are comprised of frames displaying related data;
   identifying, based on the plurality of feature vectors, at least one segment characteristic that appears in at least one frame of each of the respective segments, wherein the segment characteristic corresponds to a visual attribute of the at least one frame of each of the respective segments;
   in response to identifying the at least one segment characteristic, determining a range of values corresponding to the at least one segment characteristic based on the plurality of feature vectors, and
   training the machine learning model to associate the determined range of values with the at least one segment characteristic using the plurality of feature vectors to produce a machine learning model output for providing a content item recommendation, wherein the content item recommendation comprises a content item with at least one frame incorporating the at least one segment characteristic corresponding to the determined range of values.

2. The method of claim 1, wherein the plurality of feature vectors correlated to one another are from at least one video.

3. The method of claim 1, wherein the plurality of feature vectors comprise information indicative of a texture associated with at least one frame of a video, a shape intensity based on a transform of the at least one frame of the video, and temporal data corresponding to the at least one frame of the video.

4. The method of claim 3, wherein the transform of the at least one frame of the video is based on a Generalized Hough Transform.

5. The method of claim 1, wherein the machine learning model comprises at least one neural network.

6. A system for training a machine learning model, the system comprising:
   input circuitry configured to receive a plurality of feature vectors from at least two different videos correlated to one another, wherein the plurality of feature vectors comprise information indicative of texture and shape intensity from respective segments of each different video that are comprised of frames displaying related data; and
   control circuitry configured to:
   identify, based on the plurality of feature vectors, at least one segment characteristic that appears in at least one frame of each of the respective segments, wherein the segment characteristic corresponds to a visual attribute of the at least one frame of each of the respective segments;
   in response to identifying the at least one segment characteristic, determine a range of values corresponding to the at least one segment characteristic based on the plurality of feature vectors, and
   train the machine learning model to associate the determined range of values with the at least one segment characteristic using the plurality of feature vectors to produce a machine learning model output for providing a content item recommendation, wherein the content item recommendation comprises a content item with at least one frame incorporating the at least one segment characteristic corresponding to the determined range of values.

7. The system of claim 6, wherein the plurality of feature vectors correlated to one another are from at least one video.

8. The system of claim 6, wherein the plurality of feature vectors comprise information indicative of a texture associated with at least one frame of a video, a shape intensity based on a transform of the at least one frame of the video, and temporal data corresponding to the at least one frame of the video.

9. The system of claim 8, wherein the transform of the at least one frame of the video is based on a Generalized Hough Transform.

10. The system of claim 6, wherein the machine learning model comprises at least one neural network.

11. An apparatus for training a machine learning model, the apparatus comprising:
    means for receiving a plurality of feature vectors from at least two different videos correlated to one another, wherein the plurality of feature vectors comprise information indicative of texture and shape intensity from respective segments of each different video that are comprised of frames displaying related data;
    means for identifying, based on the plurality of feature vectors, at least one segment characteristic that appears in at least one frame of each of the respective segments, wherein the segment characteristic corresponds to a visual attribute of the at least one frame of each of the respective segments;
    in response to identifying the at least one segment characteristic, means for determining a range of values corresponding to the at least one segment characteristic based on the plurality of feature vectors, and
    means for training the machine learning model to associate the determined range of values with the at least one segment characteristic using the plurality of feature vectors to produce a machine learning model output for providing a content item recommendation, wherein the content item recommendation comprises a content item with at least one frame incorporating the at least one segment characteristic corresponding to the determined range of values.

12. The apparatus of claim 11, wherein the plurality of feature vectors correlated to one another are from at least one video.

13. The apparatus of claim 11, wherein the plurality of feature vectors comprise information indicative of a texture associated with at least one frame of a video, a shape intensity based on a transform of the at least one frame of the video, and temporal data corresponding to the at least one frame of the video.

14. The apparatus of claim 13, wherein the transform of the at least one frame of the video is based on a Generalized Hough Transform.

15. The apparatus of claim 11, wherein the machine learning model comprises at least one neural network.

16. A non-transitory computer-readable medium having instructions encoded thereon that when executed by the control circuitry cause the control circuitry to:
   receive a plurality of feature vectors from at least two different videos correlated to one another, wherein the plurality of feature vectors comprise information indicative of texture and shape intensity from respective segments of each different video that are comprised of frames displaying related data;
   identify, based on the plurality of feature vectors, at least one segment characteristic that appears in at least one frame of each of the respective segments, wherein the segment characteristic corresponds to a visual attribute of the at least one frame of each of the segments;
   in response to identifying the at least one segment characteristic, determine a range of values corresponding to the at least one segment characteristic based on the plurality of feature vectors, and
   train a machine learning model to associate the determined range of values with the at least one segment characteristic using the plurality of feature vectors to produce a machine learning model output for providing a content item recommendation, wherein the content item recommendation comprises a content item with at least one frame incorporating the at least one segment characteristic corresponding to the determined range of values.

17. The non-transitory computer-readable medium of claim 16, wherein the plurality of feature vectors correlated to one another are from at least one video.

18. The non-transitory computer-readable medium of claim 16, wherein the plurality of feature vectors comprise information indicative of a texture associated with at least one frame of a video, a shape intensity based on a transform of the at least one frame of the video, and temporal data corresponding to the at least one frame of the video.

19. The non-transitory computer-readable medium of claim 18, wherein the transform of the at least one frame of the video is based on a Generalized Hough Transform.

20. The non-transitory computer-readable medium of claim 16, wherein the machine learning model comprises at least one neural network.

* * * * *